(12) United States Patent
Achour et al.

(10) Patent No.: US 11,476,588 B2
(45) Date of Patent: Oct. 18, 2022

(54) META-STRUCTURE ANTENNA SYSTEM WITH ADAPTIVE FREQUENCY-BASED POWER COMPENSATION

(71) Applicant: Metawave Corporation, Palo Alto, CA (US)

(72) Inventors: Maha Achour, Palo Alto, CA (US); Raul Alidio, Palo Alto, CA (US); Chiara Pelletti, Palo Alto, CA (US)

(73) Assignee: METAWAVE Corporation, Carlsbad, CA (US)

( * ) Notice: Subject to any disclaimer, the term of this patent is extended or adjusted under 35 U.S.C. 154(b) by 761 days.

(21) Appl. No.: 16/391,236

(22) Filed: Apr. 22, 2019

(65) Prior Publication Data
US 2019/0326684 A1 Oct. 24, 2019

Related U.S. Application Data

(60) Provisional application No. 62/660,888, filed on Apr. 20, 2018.

(51) Int. Cl.
*H01Q 21/00* (2006.01)
*H01Q 1/36* (2006.01)
(Continued)

(52) U.S. Cl.
CPC ........... *H01Q 21/0025* (2013.01); *G01S 7/03* (2013.01); *G01S 7/032* (2013.01); *G01S 7/4013* (2021.05); *G01S 13/02* (2013.01); *G01S 13/4463* (2013.01); *G01S 13/931* (2013.01); *H01Q 1/3233* (2013.01); *H01Q 1/36* (2013.01);
(Continued)

(58) Field of Classification Search
CPC ........ H01Q 21/0025; H01Q 1/36; H01Q 3/34; H01Q 13/22; H01Q 21/064; H01Q 1/3233; G01S 7/032; G01S 7/35; G01S 7/4013; G01S 13/4463; G01S 13/931; G01S 13/343; G01S 13/345; G01S 2013/0254; G01S 7/03; G01S 13/02; H04W 16/28
See application file for complete search history.

(56) References Cited

U.S. PATENT DOCUMENTS

| | | | | |
|---|---|---|---|---|
| 2006/0092079 A1* | 5/2006 | de Rochemont | .. | H01Q 21/0025 343/895 |
| 2012/0194399 A1* | 8/2012 | Bily | ...................... | H01Q 15/02 343/700 R |

(Continued)

*Primary Examiner* — Erin F Heard
*Assistant Examiner* — Ismaaeel A. Siddiquee
(74) *Attorney, Agent, or Firm* — Sandra Lynn Godsey (57) ABSTRACT

Examples disclosed herein relate to a Meta-Structure ("MTS") antenna system with adaptive frequency-based power compensation. The MTS antenna system includes a radiating array structure having a plurality of radiating elements, and a transmission array structure coupled to the radiating array structure and feeding a transmission signal through to the radiating array structure. The transmission array structure has a plurality of super element transmission paths, each having a plurality of vias to form transmission paths and a plurality of slots for feeding the transmission signal to the radiating array structure, and a plurality of power amplifiers coupled to an adaptive feedback module, each power amplifier coupled to a super element transmission path, the adaptive feedback module to adjust a power gain at a center frequency.

20 Claims, 8 Drawing Sheets

(51) Int. Cl.
*G01S 7/03* (2006.01)
*H01Q 13/22* (2006.01)
*H01Q 21/06* (2006.01)
*H01Q 3/34* (2006.01)
*G01S 13/02* (2006.01)
*G01S 13/931* (2020.01)
*G01S 13/44* (2006.01)
*G01S 7/40* (2006.01)
*H01Q 1/32* (2006.01)
G01S 7/35 (2006.01)
H04W 16/28 (2009.01)
G01S 13/34 (2006.01)

(52) U.S. Cl.
CPC ............... *H01Q 3/34* (2013.01); *H01Q 13/22* (2013.01); *H01Q 21/064* (2013.01); *G01S 7/35* (2013.01); *G01S 13/343* (2013.01); *G01S 13/345* (2013.01); *G01S 2013/0254* (2013.01); *H04W 16/28* (2013.01)

(56) References Cited

U.S. PATENT DOCUMENTS

2015/0035545 A1* 2/2015 Langer .................. G01R 21/00
324/629
2015/0318618 A1* 11/2015 Chen ...................... H01P 7/082
343/750

\* cited by examiner

META-STRUCTURE ANTENNA SYSTEM WITH ADAPTIVE FREQUENCY-BASED POWER COMPENSATION

CROSS-REFERENCE TO RELATED APPLICATIONS

This application claims priority to U.S. Provisional Application No. 62/660,888, filed on Apr. 20, 2018, and incorporated herein by reference in their entirety.

BACKGROUND

In a wireless transmission system, such as radar or cellular communications, the size of the antenna is determined by applications, configuration of the antenna, the design and structure of the radiating elements, the transmission characteristics, goals of the system, manufacturability and other requirements and/or restrictions. With the widespread application of wireless applications, the footprint and other parameters allocated for a given antenna, or radiating structure, are constrained. In addition, the demands on the capabilities of antenna systems continue to increase, such as increased bandwidth, finer control, increased range and so forth. The present inventions provide power antenna structures to meet these and other goals.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

A Meta-Structure ("MTS") antenna system with adaptive frequency-based power compensation is disclosed. The MTS antenna system is suitable for many different applications and can be deployed in a variety of different environments and configurations. As generally described herein below, the MTS antenna system provides smart beam steering and beam forming using MTS radiating structures in a variety of configurations to increase performance for vehicular radar modules in particular. These include a variety of radiating elements and array structures. Each array of elements receives signals and power through a feed network which divides the power from a given source or sources to the various portions of the array and/or elements. This power distribution is referred to herein as a feed network and there are structures and configurations within the feed network designed to increase performance of the antenna. The feed network design provides a mechanism to control the radiated beam, such as for beam steering, as well as to craft the shape of the beam, such as through tapering.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
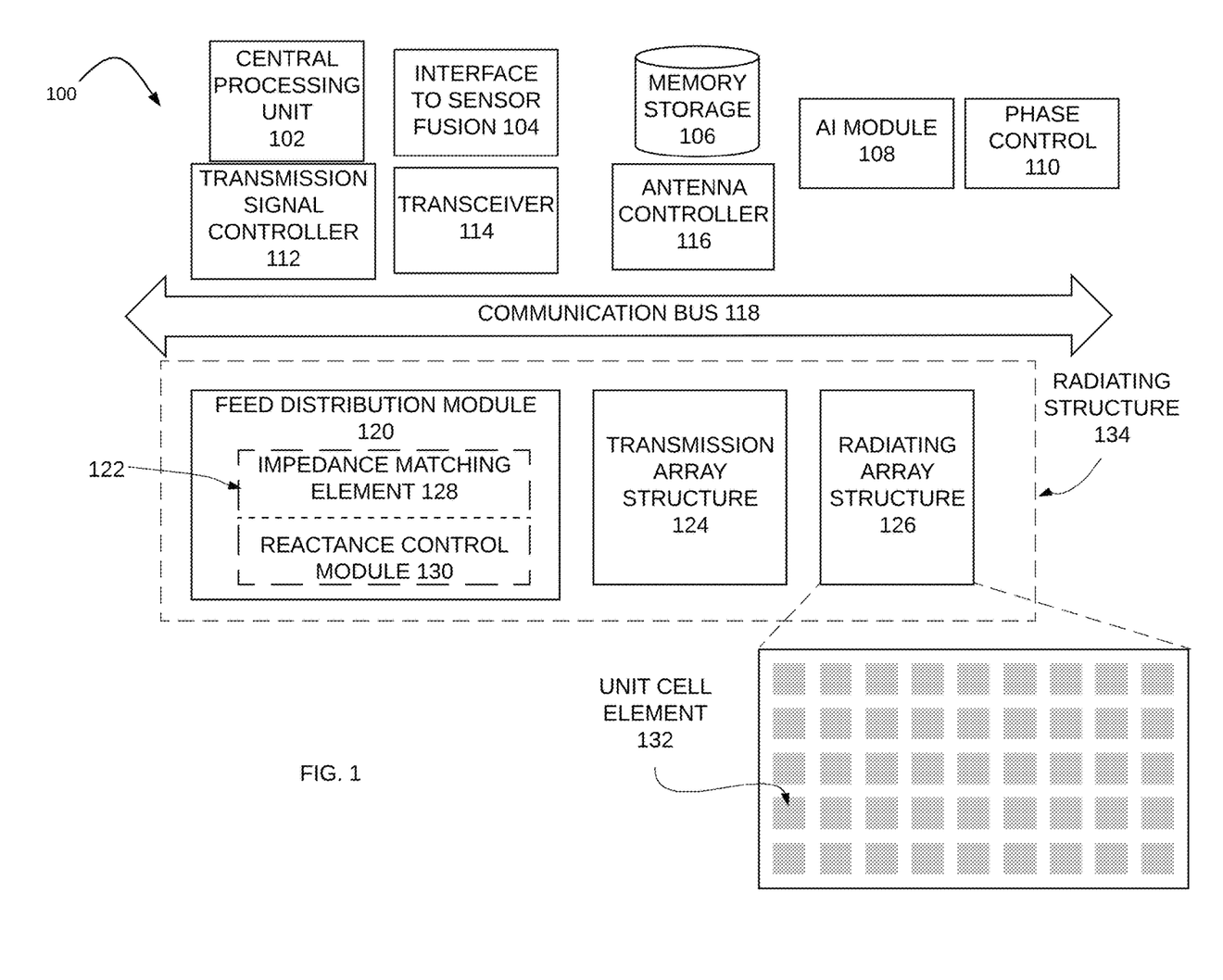
FIG. 1 illustrates a schematic diagram of an MTM antenna system in accordance with various examples.

Referring now to FIG. 1, a schematic diagram of an MTS antenna system in accordance with various examples is described. These examples are not meant to be limiting and are applicable to many different applications, including, for example, in automotive radar systems, such as to support autonomous driving and/or Automated Driver Assist Systems ("ADAS")", 5G communications, fixed wireless, and so on. MTS antenna system 100 includes modules such as radiating structure 134 coupled to an antenna controller 116, a central processor 102, and a transceiver 114. A signal is provided to antenna system 100 and the transmission signal controller 112 may act as an interface, translator or modulation controller, or otherwise as required for the signal to propagate through antenna system 100.

In various examples, the transmission signal controller 112 generates a transmission signal, such as a Frequency Modulated Continuous Wave ("FMCW"), which is used for example, in radar or other applications as the transmitted signal is modulated in frequency, or phase. The FMCW signal enables radar to measure range to an object by measuring the phase differences in phase or frequency between the transmitted signal and the received signal, or the reflected signal. Other modulation types may be incorporated according to the desired information and specifications of a system and application. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth. The received information is stored in a memory storage unit 106, wherein the information structure may be determined by the type of transmission and modulation pattern. Other modulation schemes may be employed to achieve the desired results.

The transmission signal controller 112 may generate a cellular modulated signal, such as orthogonal frequency division multiple ("OFDM") signal. In some examples, the signal is provided to the antenna system 100 and the transmission signal controller 112 may act as an interface, translator or modulation controller, or otherwise as required for the signal to propagate through a transmission line system.

The present invention is described with respect to a radar system, where the radiating structure 134 is a structure having a feed structure with an array of transmission lines feeding a radiating array. The transmission line has various portions, wherein a first portion receives a transmission signal as an input, such as from a coaxial cable or other supply structure, and the transmission signal traverses a substrate portion to divide the transmission signal through a feed-style network resulting in multiple transmission lines that feed multiple super elements. Each super element includes a transmission line having a plurality of slots. The transmission signal radiates through these slots in the super elements of the transmission array to an array of MTS elements positioned proximate the super elements. In various examples presented herein, the MTS array is overlaid on the super elements, but a variety of configurations may be implemented. The super elements effectively feed the transmission signal to the MTS array elements, from which the transmission signal radiates. Control of the MTS array elements results in a directed signal or beam form.

In operation, the antenna controller 116 receives information from other modules in antenna system 100 indicating a next radiation beam, wherein a radiation beam may be specified by parameters such as beam width, transmit angle, transmit direction and so forth. The antenna controller 116 determines the direction, power, and other parameter of the beams and controls the radiation structure 134 to achieve beam steering in various directions. The design of the system 100 determines the range of angles over which the antenna may be steered. Steering is to change the direction of the main lobe of a radiation beam toward a specific direction.

For example, where the beam has a boresight original direction approximately perpendicular to the plane of the antenna, the system 100 may steer the beam x degrees in a first angular direction and y degrees in a second angular direction. The angles x and y may be equal or may be different. The system 100 may steer the beams in an azimuth, or horizontal, direction with respect to the antenna plane or may steer in an elevation, or vertical, direction with respect to the antenna plane. A 2-dimensional antenna steers in both azimuth and elevation.

Transceiver 114 prepares a signal for transmission, such as a signal for a radar device, wherein the signal is defined by modulation and frequency. The signal is received by each element of the radiating structure 134 and the phases of radiating patterns generated by the radiating array structure 126 is controlled by the antenna controller 116. In various examples, transmission signals are received by a portion, or subarray, of the radiating array structure 126. These radiating array structures 126 are applicable to many applications, including radar in autonomous vehicles to detect objects in the environment of the car, or in wireless communications, medical equipment, sensing, monitoring, and so forth. Each application type incorporates designs and configurations of the elements, structures and modules described herein to accommodate their needs and goals.

Radiating structure 134 includes a feed distribution module 120 coupled to a transmission array structure 124 for transmitting signals through radiating array structure 126, which generates controlled radiation beams that may then be reflected back and ultimately analyzed by other modules in antenna system 100 (e.g., AI module 108 for object detection and identification in an autonomous driving application). An interface to sensor fusion module 104 interfaces with other sensor modules in antenna system 100 and a sensor fusion module (not shown) that processes the data from antenna system 100 and other sensors to detect and locate objects and provide an understanding of the surrounding environment. It is appreciated that antenna controller 116 may receive signals in response to processing of previous signals by AI module 108 or interface to sensor fusion module 104, or it may receive signals based on program information from memory storage unit 106.

In the case of a vehicular control system, for example, a sensor fusion module typically receives information (digital and/or analog form) from multiple sensors and then interprets that information, making various inferences and initiating actions accordingly. One such action is to provide information to an antenna controller 116, wherein that information may be the sensor information or may be an instruction to respond to sensor information and so forth. The sensor information may provide details of an object detected by one or more sensors, including the object's range, velocity, acceleration, and so forth. The sensor fusion may detect an object at a location and instruct the antenna controller 116 to focus a beam on that location. The antenna controller 116 then responds by controlling the transmission beam through the reactance control module 130 and/or other control mechanisms for the radiating structure 134. The instruction from the antenna controller 116 acts to control generation of radiation beams, wherein a radiation beam may be specified by parameters such as beam width, transmit angle, transmit direction and so forth.

In various examples, feed distribution module 120 has a plurality of transmission lines configured with discontinuities within a conductive material and having a lattice structure of unit cell radiating elements proximate a set of transmission lines. The feed distribution module 120 includes a coupling module for providing an input signal to the transmission lines, or a portion of the transmission lines. In some examples, the coupling module is a power divider structure that divides the signal among the plurality of transmission lines, wherein the power may be distributed equally among the N transmission lines or may be distributed according to another scheme, wherein the N transmission lines do not all receive a same signal strength.

The feed distribution module 120 has an impedance matching element 128 and a reactance control module 130. The reactance control module 130 is capable of modifying a reactance of the radiating array structure 126. The impedance matching element 130 may be configured to match the input signal parameters with radiating elements, and therefore, there are a variety of configurations and locations for this element, which may include a plurality of components. In one example, the impedance matching element 128 includes a directional coupler having an input port to each of adjacent transmission lines. The adjacent transmission lines and the impedance matching element 128 form a super element, wherein the adjacent transmission line pair has a specific phase difference, such as a 90° phase difference with respect to each other.

The impedance matching element 128 works in coordination with the reactance control module 130 to provide phase shifting of the radiating signal(s) from radiating array structure 126. In various examples, reactance control module 130 includes a reactance control mechanism controlled by antenna controller 116, which may be used to control the phase of a radiating signal from radiating array structure 126 and to adjust the effective reactance of a transmission line and/or a radiating element fed by a transmission line. Reactance control module 130 may, for example, include a phase shift network system (not shown) to provide any desired phase shift up to 360°. The reactance control module 130 in some examples is integrated into an amplifier, such as in a Low Noise Amplifier ("LNA") for received signals and a Power Amplifier ("PA") or High-Power Amplifier ("HPA") for a transmit path. In some examples, a phase control module 110 provides changes in phases of signals provided to the radiating array structure 126. Phase control module 110 changes the phase of signals propagating through transmission array structure 124 and/or presented to radiating array structure 126.

A varactor diode acts as a variable capacitor when a reverse bias voltage is applied. As used herein, the reverse bias voltage is also referred to herein as reactance control voltage or varactor voltage. The value of the reactance, which in this case is capacitance, is a function of the reverse bias voltage value. By changing the reactance control voltage, the capacitance of the varactor diode is changed over a given range of values. Alternate examples may use alternate methods for changing the reactance, which may be electrically or mechanically controlled. In some examples, a varactor diode may also be placed between conductive areas of a radiating element. With respect to the radiating element, changes in varactor voltage produce changes in the effective capacitance of the radiating element. The change in effective capacitance changes the behavior of the radiating element and in this way the varactor may be considered as a tuning element for the radiating elements in beam formation.

The reactance control mechanism enables control of the reactance of a fixed geometric transmission line. One or more reactance control mechanisms may be placed within a transmission line. Similarly, reactance control mechanisms may be placed within multiple transmission lines to achieve a desired result. The reactance control mechanisms may have individual controls or may have a common control. In some examples, a modification to a first reactance control mechanism is a function of a modification to a second reactance control mechanism.

It is appreciated that the impedance matching element 128 and the reactance control module 130 may be positioned within the architecture of feed distribution module 120. Alternatively, one or both of impedance matching element 128 and reactance control module 130 may be external to the feed distribution module 120 for manufacture or composition as an antenna or radar module.

For structures incorporating a dielectric substrate to form a transmission path, such as a Substrate Integrated Waveguide ("SIW"), a layered antenna design, or a folded antenna design, reactance control may be achieved through integration with the transmission line, such as by inserting a microstrip or strip line portion that will support the RCM. Where there is such an interruption in the transmission line, a transition is made to maintain signal flow in the same direction. Similarly, the reactance control structure may require a control signal, such as through a DC bias line or other control means, to enable the system 100 to control and adjust the reactance of the transmission line. Some embodiments of the present invention include a structure(s) that acts to isolate the control signal from the transmission signal. In the case of an antenna transmission structure, the isolation structure may be a resonant control module that serves to isolate DC control signal(s) from AC transmission signals.

The various examples disclosed herein are applicable in wireless communication and radar applications, and in particular those incorporating radiating elements, such as meta-structure ("MTS") or metamaterial ("MTM") structures capable of manipulating electromagnetic waves using engineered radiating structures. Additionally, the various examples herein are applicable in systems for generating wireless signals, such as radar signals, having improved directivity, reduced undesired radiation patterns aspects, such as side lobes. The present examples provide antennas with unprecedented capability of generating Radio Frequency ("RF") waves for radar systems. System 100 can be used to provide improved sensor capability and support autonomous driving. The system 100 is not limited to these applications and may be readily employed in other antenna applications, such as wireless communications, 5G cellular, fixed wireless and so forth.

In cellular systems, system 100 enables systems of ultra-wide band in millimeter wave spectrum at high frequency, making these systems dense, ultra-fast, low latency, reliable, and expansive. There is more capacity for devices, data and communications from unified connectivity. System 100 is also applicable in 5G wireless systems to provide higher coverage and availability in dense networks. These new services include machine-to-machine ("M2M"), Internet of things ("IoT") applications with low power and high throughput.

In various examples, the system 100 has antenna beam steering capability integrated with Radio Frequency Integrated Circuits ("RFICs"), such as millimeter wave ICs ("MMICs") for providing RF signals at multiple steering angles. The antenna may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. The meta-structure antenna may include various structures and layers, including, for example, a feed or power division layer to divide power and provide impedance matching, an RF circuit layer with RFICs to provide steering angle control and other functions, and a meta-structure antenna layer with multiple microstrips, gaps, patches, vias, and so forth. The meta-structure layer may include a metamaterial layer. Various configurations, shapes, designs and dimensions of the beam steering antenna may be used to implement specific designs and meet specific constraints.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

In some examples, a radar system steers a highly-directive RF beam that can accurately determine the location and speed of road objects. These examples for antenna system 100 are not prohibited by weather conditions or clutter in an environment. Examples of antenna system 100 may be implemented in radar applications to provide information for 2D image capability as they measure range and azimuth angle, providing distance to an object and azimuth angle identifying a projected location on a horizontal plane, respectively, without the use of traditional large antenna elements.

Antenna system 100 includes radiating structure 134, such as for radar and cellular antennas, and provides enhanced phase shifting of the transmitted signal to achieve transmission in the autonomous vehicle range, which in the US is approximately 77 GHz and has a 5 GHz range, specifically, 76 GHz to 81 GHz. Antenna system 100 reduces the computational complexity of the system and increases the transmission speed. Antenna system 100 accomplishes these goals by taking advantage of the properties of hexagonal structures coupled with novel feed structures. In some examples, antenna system 100 accomplishes these goals by taking advantage of the properties of MTS structures coupled with novel feed structures.

As illustrated, radiating structure 134 includes the radiating array structure 126, composed of individual radiating cells such as cell 132. The radiating array structure 126 may take a variety of forms and is designed to operate in coordination with the transmission array structure 124, wherein individual radiating cells (e.g., cell 132) correspond to elements within the transmission array structure 124. As illustrated, the radiating array structure 126 is an array of unit cell elements (e.g., an 8×16 array), wherein each of the unit cell elements has a uniform size and shape; however, some examples may incorporate different sizes, shapes, configurations and array sizes. When a transmission signal is provided to the radiating structure 134, such as through a coaxial cable or other connector, the signal propagates through the feed distribution module 120 to the transmission array structure 124 and then to radiating array structure 126 for transmission through the air.

MTS unit cells include a variety of conductive structures and patterns, such that a received transmission signal is radiated therefrom. An MTS unit cell (e.g., cell 132) acts as an artificial material, meaning a material that is not naturally occurring. The MTS array in radiating array structure 126 is a periodic arrangement of unit cells that are each smaller than the transmission wavelength. Each MTS unit cell has some unique properties. These properties include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications.

The metamaterial antennas may take any of a variety of forms, some of which are described herein for comprehension; however, this is not an exhaustive compilation of the possible implementations of antenna system 100. Metamaterials are typically arranged in repeating patterns. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 2:
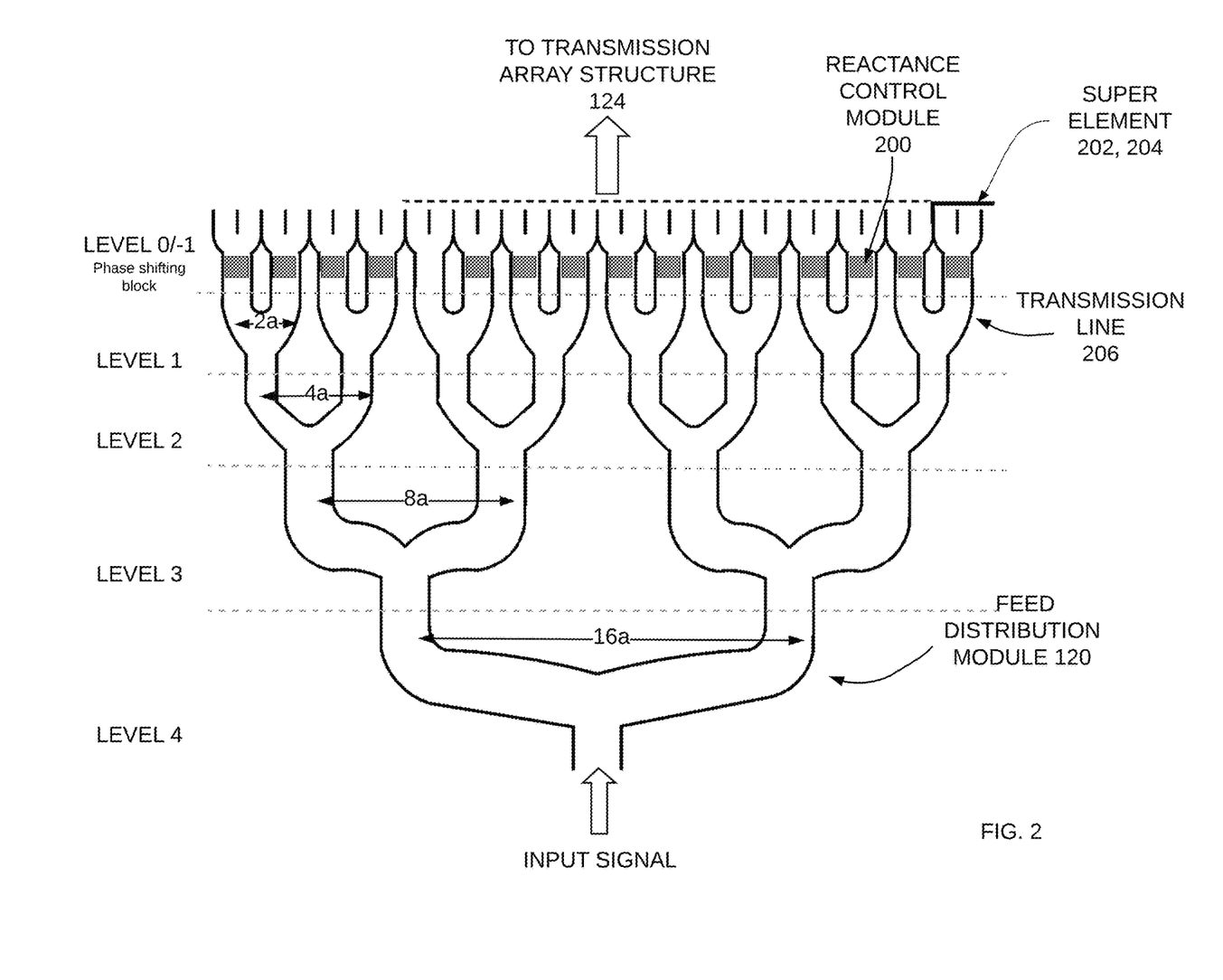
FIG. 2 illustrates a corporate feed for a transmission line array, such as for a radiating structure according to various examples.

Attention is now directed to FIG. 2, which illustrates a perspective view of a feed distribution module 120 coupled to transmission array structure 124, which feeds radiating array structure 126. The feed distribution module 120 extends and couples to the transmission array structure 124. The radiating array structure 126 is configured as a lattice of unit cells radiating elements (as shown in FIG. 1). The unit cells (e.g., cell 132 in FIG. 1) are MTS artificially engineered conductive structures that act to radiate and/or receive a transmission signal. The lattice structure is positioned proximate the transmission line array structure 124 such that the signal fed into the transmission lines of the array structure 124 are received at the lattice.

As shown in FIG. 2, feed distribution module 120 provides a corporate feed dividing the transmission signals received for propagation to multiple super elements. In this example, the feed distribution module 120 is a type of power divider circuit. The input signal is fed in through the various paths. This configuration is an example and is not meant to be limiting to the specific structure disclosed.

Within the feed distribution module 120 is a network of paths, wherein each of the division points is identified according to a division level. The feed distribution module 120 receives input signals, which propagate through the network of paths to the transmission array structure 124 as shown in FIG. 1. In this example, the paths have similar dimensions; however, the size of the paths may be configured to achieve a desired transmission and/or radiation result. In the present example, the transmission line 206, or path portion, is at LEVEL 1, which is the level of paths feeding the super elements of the transmission array structure 124. The transmission line 206 includes a reactance control module 200, which acts to change the reactance of the transmission line 206 resulting in a change to the signal propagating through the transmission line 206 to the super elements 202, 204. The reactance control module 200 is incorporated into transmission line 206 in the example shown in FIG. 1. There are a variety of ways to couple the reactance control module 200 to one or more transmission lines. As illustrated, the other paths of LEVEL 1 have reactance control mechanisms that may be the same as the mechanism provided by reactance control module 200.

The transmission lines of the feed distribution module 120 reside in the substrate of the radiating structure 134. Transmission line 206 is coupled to super elements 202-204, such that the reactance control module 200 effects both super elements. Note that the reactance control mechanism may be positioned otherwise within the paths leading to one or more super elements and may be distributed across the super elements in a patterned fashion, random or otherwise.

Figure 3:
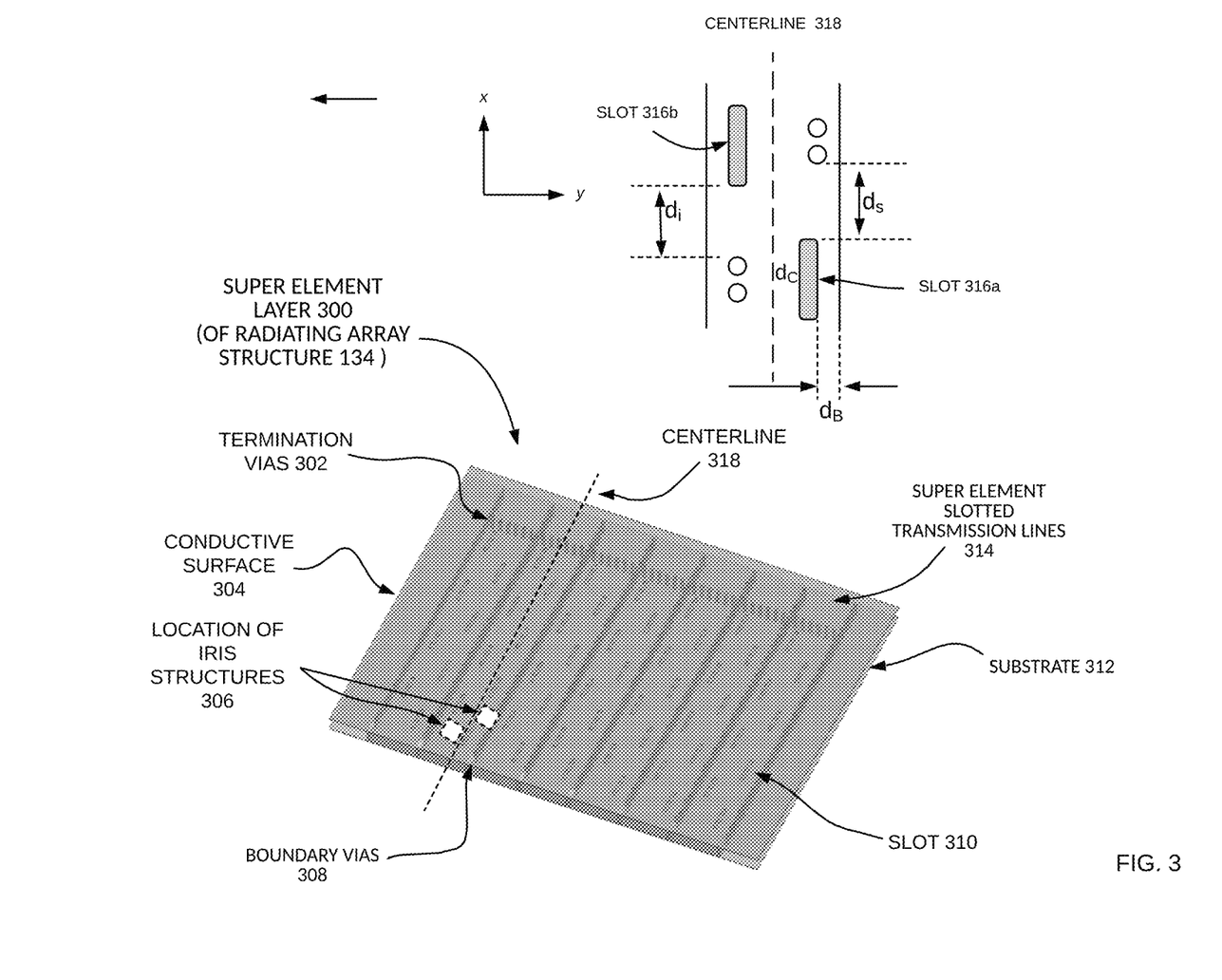
FIG. 3 illustrates antenna structures, according to various examples.

FIG. 3 illustrates a top view of a super element layer 300 which is part of the transmission array structure 124 within radiating structure 134, according to some examples. The radiating structure 134 is a composite substrate, having multiple layers, wherein the layer 201 illustrated is formed of two conductive layers and a dielectric there between. A substrate, such as a Rogers material, having specific parameters, such as low dielectric loss, and so forth, that are applicable to high frequency circuits may be used. For example, a Rogers CLTE-AT product exhibits thermal and phase stability across temperature and is used in automotive radar and microwave applications. The layer 201 illustrated is a portion of substrate 150 wherein transmission lines are configured for propagation of a transmission signal from the input to each transmission line.

As illustrated in FIG. 3, a pair or set of transmission lines forms a super element of slotted transmission lines 314. The signal propagates through the super elements 314, radiating through discontinuities in the conductive surface 304. The radiating array structure 126 (not shown in FIG. 3) is positioned above the conductive surface 304 and includes the MTS or MTM elements that receive the signals from layer 300 and generate the transmission beams. Each MTS element (e.g., cell 132) is designed and configured to support the specified radiation patterns. element of the radiating array structure 126 is designed and configured to support the specified radiation patterns.

In the illustrated example, the radiating array structure 126 is configured to overlay the conductive surface 304 of layer 300. This portion of the transmission array structure 124 includes multiple super elements 314, each of which behave similar to a slotted wave guide but are positioned to feed the signal to radiating array structure 126. The radiating elements of radiating array structure 126 may take any of a variety of forms, including MTS, MTM, conductive patches and combinations thereof.

To improve performance and reduce losses, iris structures 306 in the substrate 312 are positioned to direct and maintain the radiated signals to the radiating array structure 126. Irises may be positioned in a variety of configurations depending on structure and application of the antenna array. The location of iris structures 312 is an example, where two irises are positioned opposite a slot with respect to centerline 318.

The antenna structure of FIG. 3 may be referred to as a type of slotted wave guide antenna ("SWGA"), wherein the SWGA acts as a feed to the radiating array structure 126. The SWGA portion includes the following structures and components: a full ground plane, a dielectric substrate, a feed network, such as direct feeds to the multi-ports transceiver chipset, an array of antenna or complementary antenna apertures, such as a slot antenna, to couple the electromagnetic field propagating in the Substrate Integrated Waveguide ("SIW") with MTS located on top of the antenna aperture. The feed network may include passive or active lump components for matching phase control, amplitude tampering, and other RF enhancement functionalities. The distances between the radiating structures can be much lower than half the wavelength of the radiating frequency of the transmission signal. Active and passive components may be placed on the radiating structures with control signals either routed internally through the radiating structure 134 or externally through or on upper portions of the substrate.

Alternate examples may reconfigure and/or modify the radiating structure 134 to improve radiation patterns, bandwidth, side lobe levels, and so forth. The SWGA loads the radiating structures to achieve the desired results. The antenna performance may be adjusted by design of the radiating structure 134 features and materials, such as the shape of the slots, slot patterns, slot dimensions, conductive trace materials and patterns, as well as other modifications to achieve impedance matching and so forth. The substrate may incorporate two portions of dielectric separated by a slotted transmission line positioned there between. The slotted transmission line sits on a substrate 312, wherein each transmission line is within a bounded area; the boundary is a line of vias cut through the conductive layer.

The slots are configured within the conductive layer 304 and spaced as illustrated in FIG. 3, where in the present example the slots 316 are positioned symmetrically with respect to the centerline 318. For clarity of understanding, FIG. 3 illustrates the slots as equidistant from centerline 318, where slots 306-*b* are on opposite sides of the centerline 318 but are equidistant to the centerline 318 and staggered along the direction thereof. Each bounded transmission line is referred to herein as a "super element" such as super element transmission lines 314.

A small portion super element is illustrated in the cut-out, having slots 306*a-b* with respect to the center line 318. The boundary vias 308 form the transmission line. The slots are staggered and have a distance in the x-direction of $d_x$. The distance in the y-direction from the edge of a slot to the boundary via is given as $d_B$, and the distance from the centerline 318 to the slot is given as $d_C$. These dimensions and positions may be altered to achieve a desired resultant beam and steering capability.

Figure 4:
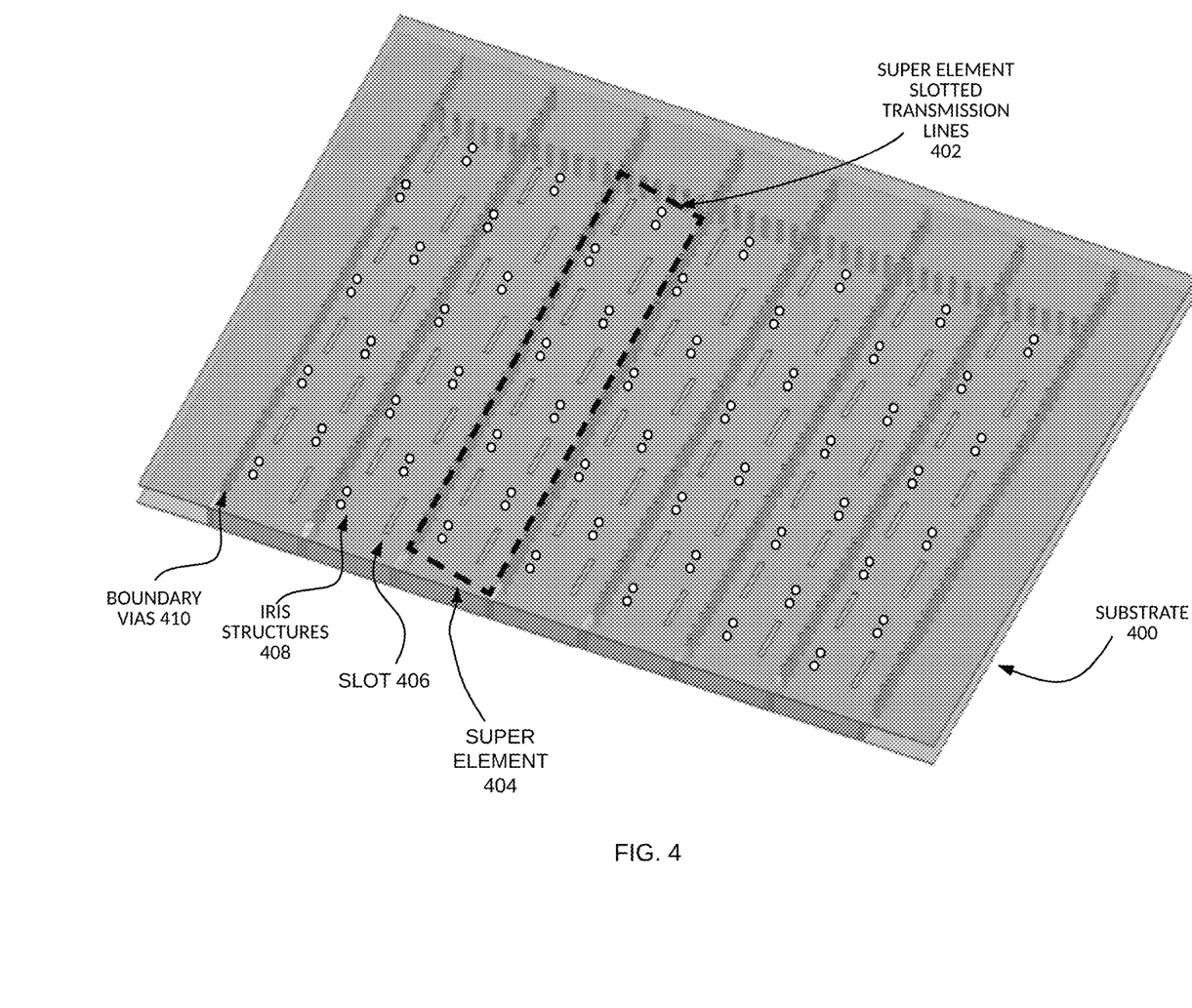
FIG. 4 illustrates a super element, in accordance with various examples.

FIG. 4 illustrates super elements, such as super element 404, positioned with length along the x-direction. The portion of transmission array structure 124 has boundary vias 410 positioned along the length of the super element in the x-direction. Iris structures 408 are formed through the conductive layer 304 at the positions illustrated and act to contain the radiation pattern through the slots, such as 406. The iris structure 408 are illustrated as two vias opposite a slot. The distance between sets of iris structures 408 in the x-direction is $d_i$, the distance between the slot 406 and the set of iris structures 408 in they-direction is $d_s$, and the distance between the set of iris structures 406 and the edge of a slot is illustrated as $d_e$. The various distances, positions and configurations of the iris structures 406 may be adjusted, changed and designed according to application. These may be implemented at various locations along the super elements and may include any number of vias depending on the desired radiation pattern and antenna behavior. In various examples, the iris structures are vias and are similarly shaped and sized. Other examples may implement different shapes, configurations and sizes to achieve a desired result for an application, such as that of FIG. 5 which illustrates a portion of a transmission array having iris structures 408 positioned closer to an edge of the slots.

Figure 5:
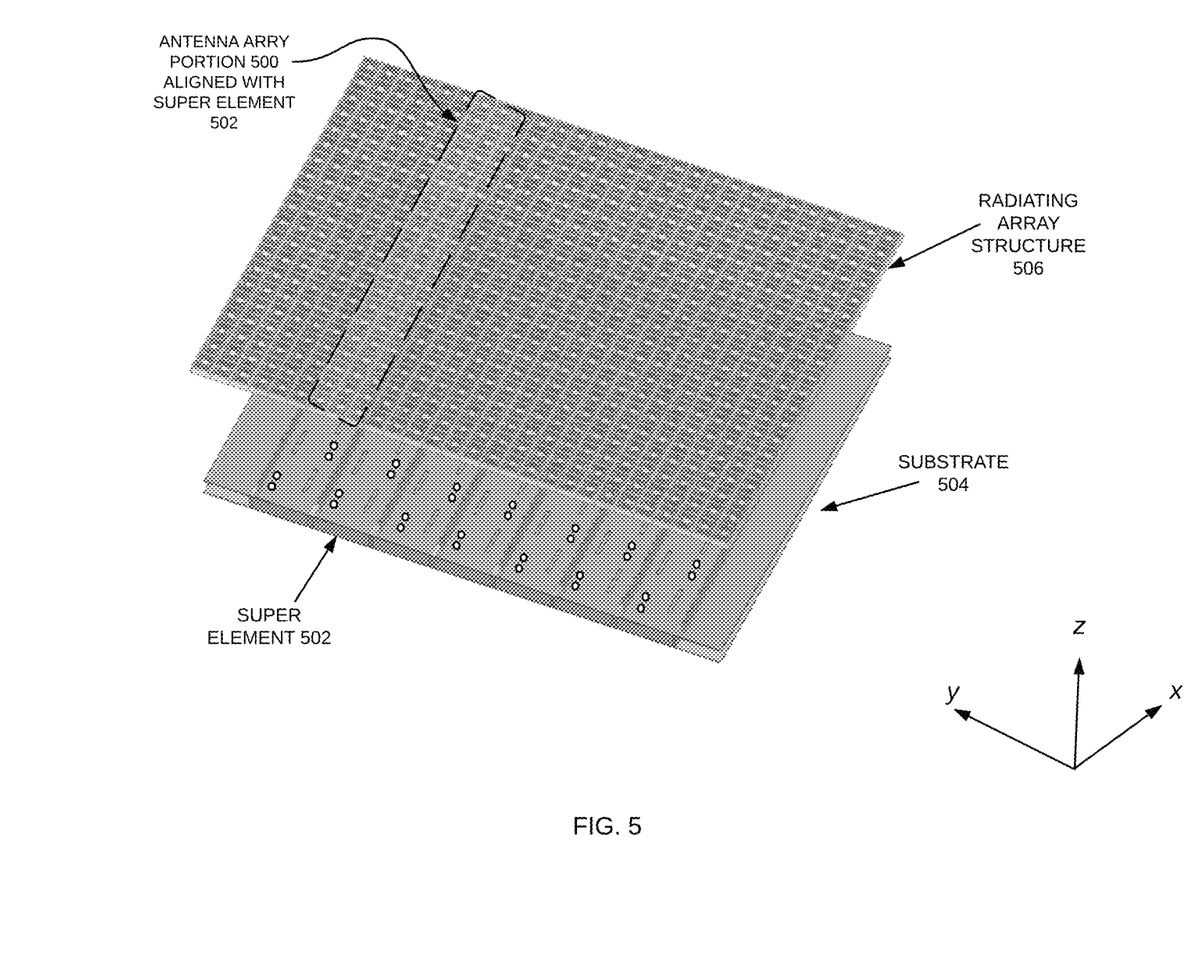
FIG. 5 illustrates an MTS radiating structure overlaid a transmission array structure, in accordance with various examples.

Attention is now directed to FIG. 5, which illustrates a top view of radiating structure 134, as in FIG. 1, wherein radiating array structure 126 is positioned proximate transmission array structure 124. As illustrated, the radiating array structure 506 sits above the transmission array structure 124 in the z-direction, which is the direction in which signals will radiate. The radiating array structure 506 is made up of a pattern of MTS elements or unit cells. These are positioned with respect to the super elements of transmission array structure 124. For example, dashed lines delineate the super element 502; a corresponding subarray 500 interacts with super element 502 for transmission of signals. The radiating array structure 506 is configured to receive a transmission signal from the slots of the super elements 502. The radiating array structure 506 may be coupled to the transmission array structure 124 having one or more layers there between. In some examples, there is an air-gap built into the layering between the various layers of the radiating structure 134. The signal from super element 502, for example, is received by subarray 500 and radiated over the air.

In some examples, the super elements of transmission array structure 124 are positioned lengthwise along the x-direction and enables scanning in that direction. In the examples provided herein, the x-direction corresponds to the azimuth or horizontal direction of the radar; the y-direction corresponds to the elevation direction; and the z-direction is the direction of the radiated signal. The radiating array structure 126 may include a periodic and uniform arrangement of unit cells positioned to interact with the super elements.

In some examples, the irises are vias formed through all or a portion of the layers of substrate 504. The irises are illustrated in the figures as cylindrical, but may take on other shapes, such as rectangular prism shapes and so forth. The vias are lined with a conductive material and act as an impedance to the wave propagating through the super elements.

Antenna system 100 and the various structures thereon described above with reference to FIGS. 1-5, has a performance that may be affected by losses or other effects such as antenna squint. Squint, as generally described herein, refers to the angle that the antenna transmission is offset from the normal of the antenna plan, or the change in the beam direction as a function of operating frequency, polarization, or orientation. In various millimeter wave applications such as autonomous driving, 5G communications, and fixed wireless, among others, a controlled and directed beam with minimum to no squint is highly desired. An antenna with a large squint is not capable of producing the desired gains and may suffer from considerable loss, in the order of 10 dBs. To address this challenge, an adaptive frequency-based power compensation mechanism may be incorporated in various implementations of the antenna system 100.

Figure 6:
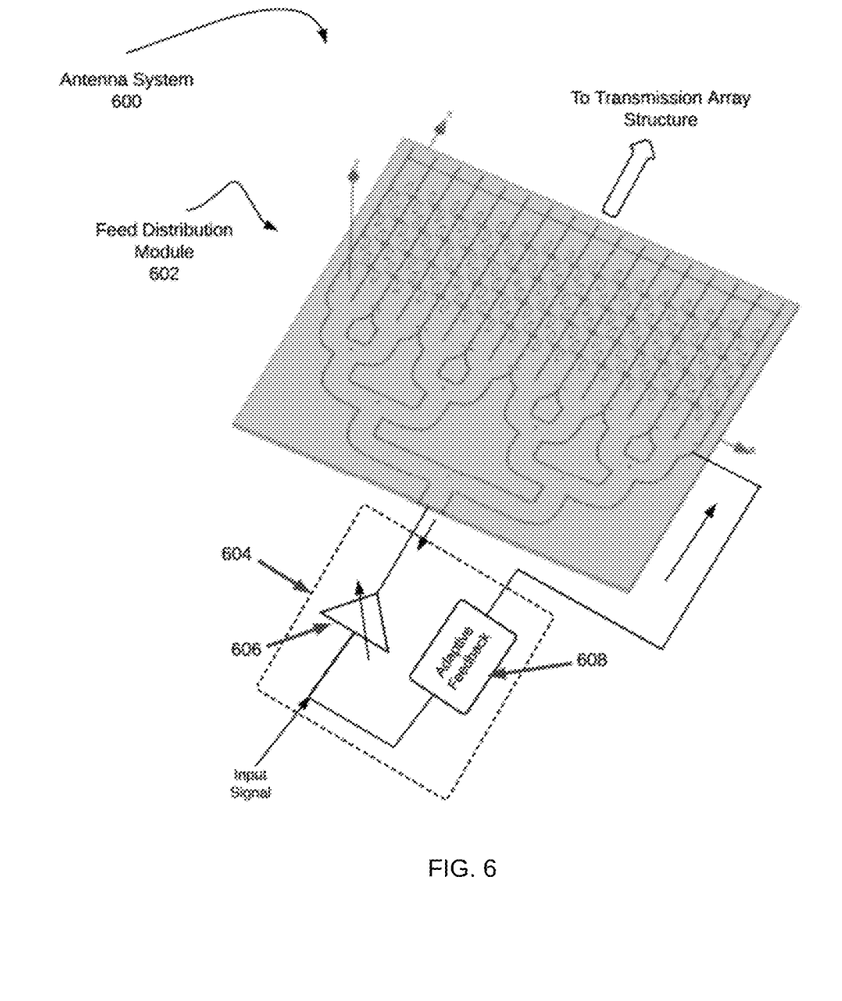
FIG. 6 shows an example adaptive compensation module coupled to a feed distribution module of an MTM antenna system.

Attention is now directed to FIG. 6, which shows an example adaptive frequency-based power compensation module coupled to a feed distribution module of an MTS antenna system. Adaptive frequency-based power compensation module 604 is coupled to feed distribution module 602 of antenna system 600. Feed distribution module 602 may be implemented as feed distribution module 120 of antenna system 100, with reference to FIGS. 1-2 described above. Compensation module 604 includes a variable Power Amplifier ("PA") 606 coupled to an adaptive feedback module 608. PA 606 is used to generate a power gain in the transmission signal input into feed distribution module 602. Adaptive feedback module 608, which may include a lookup table ("LUT") for desired power levels corresponding to different frequencies, adjusts the desired power gain from PA 606 to compensate for lower gain at certain frequency bands. In doing so, adaptive feedback module 608 contains frequency sensing mechanisms for sensing frequencies of signals in super elements of feed distribution module 602.

The goal of compensation module 604 is to optimize the power gain at center frequency in different bands and applications. For example, the center frequency for fixed wireless applications is at 60 GHz, while the center frequency for radar in autonomous driving applications is at 77 GHz. When configuring an antenna system, one optimization is to operate the system at the best conditions for the instantaneous frequency of the center frequency. This will result in good matching and result in the maximum gain. When the antenna system is operated at a frequency outside of the center frequency, the parameters of the signal may degrade, such as to reduce the gain of the antenna. The antenna system 600 therefore provides mechanisms to compensate and dynamically adapt to multiple frequencies. It is appreciated that the antenna system 600 is also particularly applicable to systems that employ wide frequency bands. Adjusting the parameters of transmission over a wide band is difficult due to these and other effects.

Figure 7:
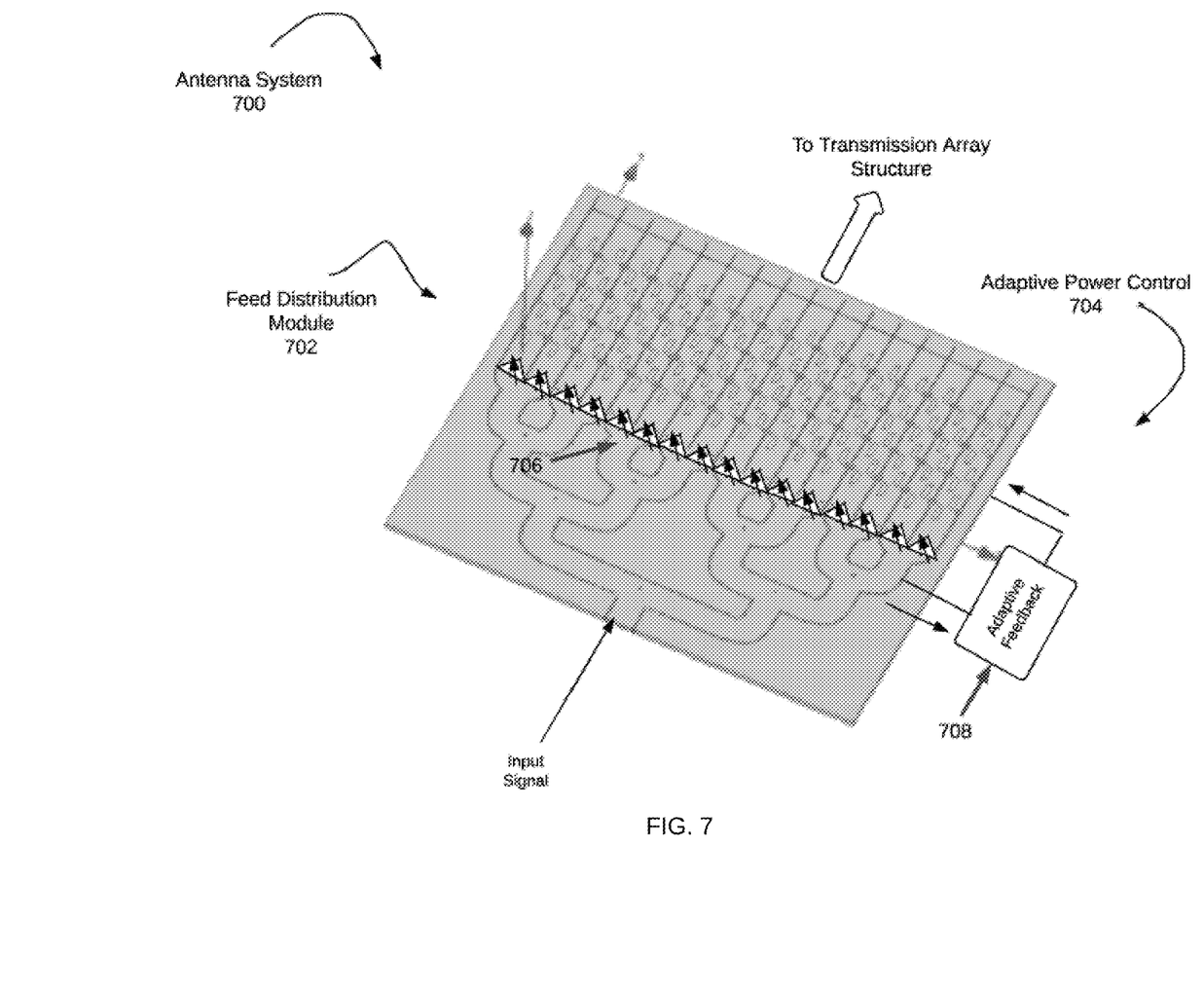
FIG. 7 shows another example of an adaptive compensation module coupled to a feed distribution module of an MTM antenna system.

FIG. 7 shows another example of an adaptive compensation module coupled to a feed distribution module of an MTS antenna system. Adaptive compensation module 704 in antenna system 700 in this case includes an array of power amplifiers 706 coupled to an adaptive feedback module 708. Adaptive feedback module 708, similar to adaptive feedback module 608, has frequency sensing mechanisms for sensing frequencies of signals in super elements of feed distribution module 702 to optimize the power gain at center frequency in different bands and applications. The goal again is to operate antenna system 700 at the best conditions for the instantaneous frequency of each desired center frequency.

Figure 8:
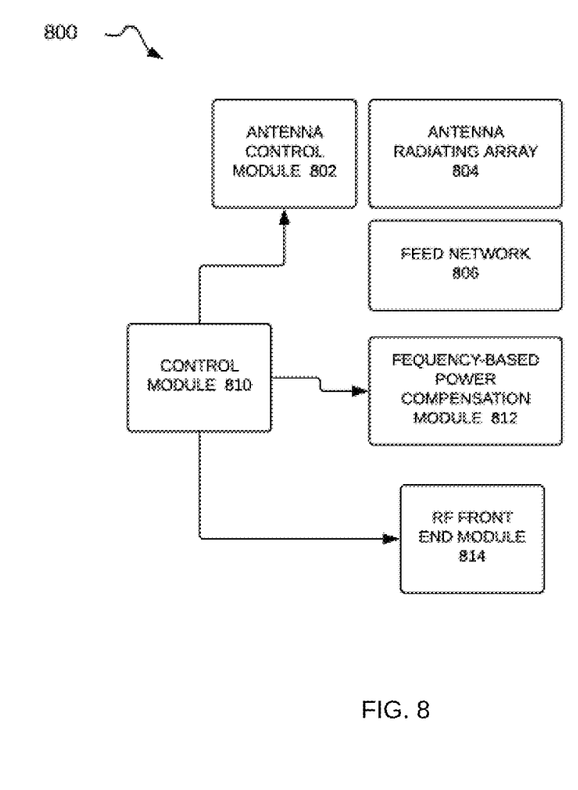
FIG. 8 is a schematic diagram of an antenna system with adaptive compensation mechanisms in accordance to various examples.

Attention is now directed to FIG. 8, which includes an antenna radiating array 804, such as a MTS array as disclosed herein and a feed network, having a power divider circuit as a corporate feed. The feed network 806 may be coupled to a frequency-based power compensation module 812 that adjusts the power into the feed network 806 to compensate for changes in the output beam form due to changes in frequency. For example, when the system has been configured and calibrated to operate at a center frequency within a given band of frequencies but is currently operating at an off-center frequency, there may be effects of the frequency difference on the output beam form. The frequency-band power compensation module 812 adjusts the power to compensate and reduce/remove unwanted effects, such as unacceptable squint. There may be any number of unwanted effects at the output of the antenna radiating array 804, that may have a similar compensation scheme.

Continuing with FIG. 8, a control module 810 controls operation of the antenna system 800 and is coupled to the RF front end module 814. The antenna control module 802 controls adjustable parameters of the antenna radiating array 804, such as to control varactors coupled to MTS elements for phase control.

In these examples, operational feedback is used for compensation and adjustment. In some examples, the output frequency is provided as feedback to the control module 810 which then acts to make adjustments to the output transmission signal, such as to increase the power. The feedback may be power sensed within the feed network 806, and so forth. As described above, in some examples, a LUT is provided that maps feedback to control actions. One action may include detecting the output frequency below the center frequency of the band to increase the power of the output signal accordingly.

Figure 9:
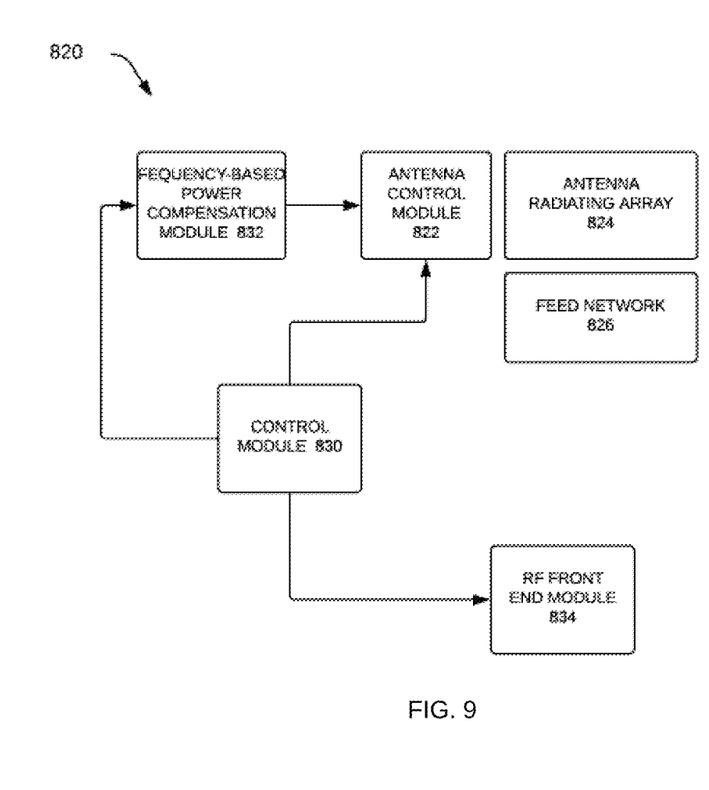
FIG. 9 is a schematic diagram of another antenna system with adaptive compensation mechanisms in accordance with various examples.

FIG. 9 illustrates an alternate system 820, similar to system 800, but having compensation mechanisms within the feed network 826 and/or the antenna radiating array 824. In this system 820, the frequency-based power compensation module 832 instructs the antenna control module 822 as to the specific adjustment to make.

In some examples, the frequency-based power compensation modules, such as modules 812 and 832, are responsive to one or more feedback, including frequency, power, gain, and so forth. The operation of these modules is to maintain consistent signal strength over a range of frequencies. This may be done by adjusting varactors within the antenna radiating array or the feed network, or by use of transistors in coordination with varactors in the feed network.

The present inventions provide methods and apparatuses for radiating a signal, such as for radar or wireless communications, using a lattice array of radiating elements and a transmission array and a feed structure. The feed structure distributes the transmission signal throughout the transmission array, wherein the transmission signal propagates along the rows of the transmission array and discontinuities are positioned along each row. The discontinuities are positioned to correspond to radiating elements of the lattice array. The radiating elements are coupled to an antenna controller that applies voltages to the radiating elements to change the electromagnetic characteristics. This change may be an effective change in capacitance that acts to shift the phase of the transmission signal. By phase shifting the signal from individual radiating elements, the system forms a specific beam in a specific direction. The resonant coupler keeps the transmission signal isolated and avoids any performance degradation from any of the processing. In various examples, the radiating elements are MTS elements. These systems are applicable to radar for autonomous vehicles, drones and communication systems. The radiating elements have a shape that is conducive to dense configurations optimizing the use of space and reducing the size of a conventional antenna.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A Meta-Structure ("MTS") antenna system with adaptive frequency-based power compensation, comprising:
  a radiating array structure comprising a plurality of radiating elements; and
  a transmission array structure coupled to the radiating array structure and configured to feed a transmission signal to the radiating array structure, the transmission array structure comprising:
    a plurality of transmission paths, each transmission path having a plurality of vias defining boundaries of the respective transmission path and a plurality of slots configured to feed the transmission signal to the radiating array structure;
    a plurality of power amplifiers coupled to the plurality of transmission paths; and
    an adaptive feedback module coupled to the plurality of power amplifiers, the adaptive feedback module configured to adjust power levels of the plurality of power amplifiers at a set of frequencies, wherein the adaptive feedback module comprises a look-up table that stores a set of the power levels corresponding to the set of frequencies.

2. The MTS antenna system of claim 1, wherein the adaptive feedback module is configured to sense a frequency of the transmission signal from the plurality of transmission paths.

3. The MTS antenna system of claim 1, wherein the radiating elements comprise meta-structures.

4. The MTS antenna system of claim 1, further comprising a phase control module configured to change a plurality of phases of signals propagating through the transmission array structure.

5. The MTS antenna system of claim 1, wherein each of the power amplifiers is coupled to one of the transmission paths.

6. The MTS antenna system of claim 1, wherein the slots in each transmission path are equidistant from a center line of the respective transmission path.

7. A radiating structure, comprising:
  a plurality of slotted transmission lines, comprising:
    a plurality of vias defining boundaries of each slotted transmission line;
    a plurality of slots are positioned along a length of each slotted transmission line; and
    a plurality of irises positioned along the length of each slotted transmission line;
  an array of radiating elements proximate above the slotted transmission lines that enables a transmission signal to be received from the slotted transmission lines and is configured to generate a radiation pattern corresponding to the transmission signal;
  a variable power amplifier coupled to the plurality of slotted transmission lines; and
  a power compensation module coupled to the variable power amplifier, wherein the power compensation module comprises a look-up table that stores a set of power levels corresponding to a set of frequencies.

8. The radiating structure as in claim 7, wherein the slots are evenly spaced along the length of each slotted transmission line.

9. The radiating structure as in claim 8, wherein the slots are equidistant from a center line of each slotted transmission line.

10. The radiating structure as in claim 8, wherein the plurality of irises are positioned in sets of irises opposite each of the slots.

11. The radiating structure as in claim 7, wherein the plurality of irises extend through a layer of the radiating structure.

12. The radiating structure as in claim 7, further comprising a reactance control module configured to adjust a phase of the array of radiating elements.

13. The radiating structure as in claim 12, wherein the reactance control module comprises at least one varactor coupled between conductors in the array of radiating elements.

14. The radiating structure of claim 7, wherein the power compensation module is configured to adjust a power gain from the variable power amplifier to compensate for antenna squint in the radiating structure.

15. The radiating structure of claim 7, wherein the power compensation module is configured to sense a frequency of the transmission signal at a location of the slotted transmission lines.

16. An antenna system, comprising:
  a radiating array structure of radiating elements, the radiating elements arranged in a set of subarrays;
  a feed network configured to provide a plurality of signals to the radiating array structure through a transmission array structure;
  an antenna control module configured to control the radiating array structure; and
  a frequency-based power compensation module coupled to the antenna control module and configured to adjust a power level to the feed network based on changes in frequency, wherein the frequency-based power compensation module comprises a look-up table that stores a set of power levels corresponding to a set of frequencies.

17. The antenna system of claim 16, wherein the radiating elements comprise meta-structures.

18. The antenna system of claim 16, wherein the transmission array structure comprises a plurality of slotted transmission lines, comprising:
  a plurality of vias defining boundaries of each slotted transmission line;
  a plurality of slots positioned along a length of each slotted transmission line; and a plurality of irises positioned along the length of each slotted transmission line.

19. The antenna system of claim 16, wherein the frequency-based power compensation module further comprises a variable power amplifier coupled to the look-up table to adjust the power level to the feed network.

20. The antenna system of claim 16, wherein each of the radiating element is a meta-structure.

\* \* \* \* \*